US012589732B2

(12) United States Patent
Khusro

(10) Patent No.: US 12,589,732 B2
(45) Date of Patent: Mar. 31, 2026

(54) DRIFT CONTROL

(71) Applicant: RIMAC TECHNOLOGY LLC, Sveta Nedelja (HR)

(72) Inventor: Yash Raj Khusro, Sveta Nedelja (HR)

(73) Assignee: RIMAC TECHNOLOGY LLC, Sveta Nedelja (HR)

( * ) Notice: Subject to any disclaimer, the term of this patent is extended or adjusted under 35 U.S.C. 154(b) by 12 days.

(21) Appl. No.: 18/897,374

(22) Filed: Sep. 26, 2024

(65) Prior Publication Data

US 2025/0108787 A1 Apr. 3, 2025

(30) Foreign Application Priority Data

Sep. 29, 2023 (EP) ..................................... 23200855

(51) Int. Cl.
B60W 30/02 (2012.01)
B60W 40/114 (2012.01)

(52) U.S. Cl.
CPC .......... B60W 30/02 (2013.01); B60W 40/114 (2013.01); B60W 2520/20 (2013.01)

(58) Field of Classification Search
CPC . B60W 30/02; B60W 40/114; B60W 2520/20
See application file for complete search history.

(56) References Cited

U.S. PATENT DOCUMENTS

| | | | | | |
|---|---|---|---|---|---|
| 8,521,349 B2 * | 8/2013 | Yu | .......................... | B60W 10/08 | |
| | | | | 701/22 | |
| 2013/0144476 A1 * | 6/2013 | Pinto | ....................... | B60L 50/00 | |
| | | | | 903/930 | |

| | | | | | |
|---|---|---|---|---|---|
| 2018/0297585 A1 * | 10/2018 | Lian | .................... | B60T 8/17552 |
| 2024/0166216 A1 * | 5/2024 | Park | ...................... | B60W 40/13 |
| 2025/0091581 A1 * | 3/2025 | Yoon | .................... | B60W 30/02 |
| 2025/0206325 A1 * | 6/2025 | Oh | .......................... | B60L 3/106 |
| 2025/0269736 A1 * | 8/2025 | Lee | ...................... | B60L 15/2036 |

FOREIGN PATENT DOCUMENTS

CN 110228462 9/2019

OTHER PUBLICATIONS

EPO, Extended European Search Report for EP Application No. 23200855.7, Mar. 19, 2024.
Wang et al., "Coordinated Control of Differential Drive Assisted Steering System with Vehicle Stability Enhancement System," IEEE Intelligent Vehicles Symposium (IV), 2011.

* cited by examiner

*Primary Examiner* — Jacob M Amick
(74) *Attorney, Agent, or Firm* — Hodgson Russ LLP

(57) ABSTRACT

A method for controlling motion of a vehicle, the method comprising the steps of: obtaining measured information related to a state of the vehicle; determining estimated information related to the state of the vehicle based on the measured information; determining a yaw moment reducing a rate of change of a body slip angle of the vehicle based on the measured information and/or the estimated information; determining at least one differential torque to be applied to at least two wheels of a same axis of the vehicle based on the body slip angle of the vehicle and the determined yaw moment; and applying the at least one differential torque to the at least two wheels of the vehicle.

14 Claims, 10 Drawing Sheets

DRIFT CONTROL

CROSS-REFERENCE

This application claims priority to European Patent Application No. 23200855.7, filed Sep. 29, 2023, the entire disclosure of which is incorporated herein by reference.

TECHNICAL FIELD

The present invention relates to controlling motion of a vehicle, specifically to determining and applying at least one differential torque to at least two wheels of a vehicle.

TECHNICAL BACKGROUND

Controlling an electric vehicle, in particular one with two or more independent motors, is open to a vast field when compared to a conventional vehicle using a single motor, such as a combustion engine. This can not only be seen during typical driving of the vehicle, but in particular during maneuvers with high body slip angles. Examples for such maneuvers are drift or powerslide, or in more general terms conditions when the vehicle is to be maintained at a high body slip angle during cornering, i.e., driving a curve.

Conventional solutions to this problem involve controlling the yaw rate, the wheel slip angle or the body slip angle of the vehicle. These approaches, however, suffer from various disadvantages. The first two options, control of the yaw rate and control of the wheel slip angle, do not allow maneuvers with high body slip angle and are thus generally unsuitable.

The third option typically tries to drive the vehicle to a predetermined angle, but this approach also has several disadvantages. First, by driving towards a predetermined angle, it may occur that the vehicle establishes itself an equilibrium but is then driven out of this equilibrium. In other words, since the predetermined angle towards which the vehicle is driven may not correspond to the equilibrium, this approach may fail to achieve its target. Second, control of the body slip angle is sensitive to uncertainties in the estimation thereof. Third, conventionally such control is only activated after a threshold is exceeded as this type of drifting control is unsuitable for normal driving. This makes the change from passive, i.e., the controller being off, to active, i.e., the controller being on, abrupt, which in turn potentially leads to abrupt changes in the vehicle behavior and/or the body slip angle. Such abrupt changes may not only make the maneuver more challenging but may also lead to the driver losing control over the vehicle and thus may pose a safety issue.

Thus, there is a need for an improved method of controlling the motion that allows to perform maneuvers at high body slip angle.

SUMMARY

The above problems, among others, are solved by the subject-matter of the independent claims. Preferred embodiments are given by the subject-matter of the dependent claims.

According to an embodiment of the present invention, there is provided a method for controlling motion of a vehicle, the method comprising the steps of: obtaining measured information related to a state of the vehicle; determining estimated information related to the state of the vehicle based on the measured information; determining a yaw moment reducing a rate of change of a body slip angle of the vehicle based on the measured information and/or the estimated information; determining at least one differential torque to be applied to at least two wheels of a same axis of the vehicle based on the body slip angle of the vehicle and the determined yaw moment; and applying the at least one differential torque to the at least two wheels of the vehicle.

According to another embodiment of the present invention, there is provided a vehicle configured to execute a method for controlling motion of a vehicle, the method comprising the steps of: obtaining measured information related to a state of the vehicle; determining estimated information related to the state of the vehicle based on the measured information; determining a yaw moment reducing a rate of change of a body slip angle of the vehicle based on the measured information and/or the estimated information; determining at least one differential torque to be applied to at least two wheels of a same axis of the vehicle based on the body slip angle of the vehicle and the determined yaw moment; and applying the at least differential torque to the at least two wheels of the vehicle.

According to a further embodiment of the present invention, there is provided a device configured to execute a method for controlling motion of a vehicle, the method comprising the steps of: obtaining measured information related to a state of the vehicle; determining estimated information related to the state of the vehicle based on the measured information; determining a yaw moment reducing a rate of change of a body slip angle of the vehicle based on the measured information and/or the estimated information; determining at least one differential torque to be applied to at least two wheels of a same axis of the vehicle based on the body slip angle of the vehicle and the determined yaw moment; and applying the at least one differential torque to the at least two wheels of the vehicle.

In other words, one concept of the present invention is that the rate of change of the body slip angle is controlled and that a yaw moment that reduces the rate of change of the body slip angle is provided.

At least the following advantages are achieved by various embodiments of the present disclosure.

By controlling, in particular by minimizing, the rate of change of the body slip angle instead of controlling the body slip angle to a predetermined value, the vehicle is not steered to a specific configuration but finds its equilibrium on its own. This makes the vehicle more controllable, i.e., more controllable during the maneuver at high body slip angle.

Further, embodiments according to the present disclosure do not override commands by the driver but instead readjust them. As a consequence, the driver's experience is more intuitive.

Embodiments according to the present disclosure can always stay active. Thus, the body slip angle changes gradually and smoothly while driving, making it easier for the driver to react and abrupt changes in the driving can be avoided. This can also improve the safety of driving the vehicle.

Further, the sensitivity to uncertainties in the estimation of the relevant parameters is reduced when considering the rate of change of the body slip angle as compared to considering the body slip angle.

BRIEF DESCRIPTION OF THE DRAWINGS

Embodiments of the present invention, which are presented for better understanding the inventive concepts, but which are not to be seen as limiting the invention, will now be described with reference to the figures in which.

DETAILED DESCRIPTION

Figure 1:
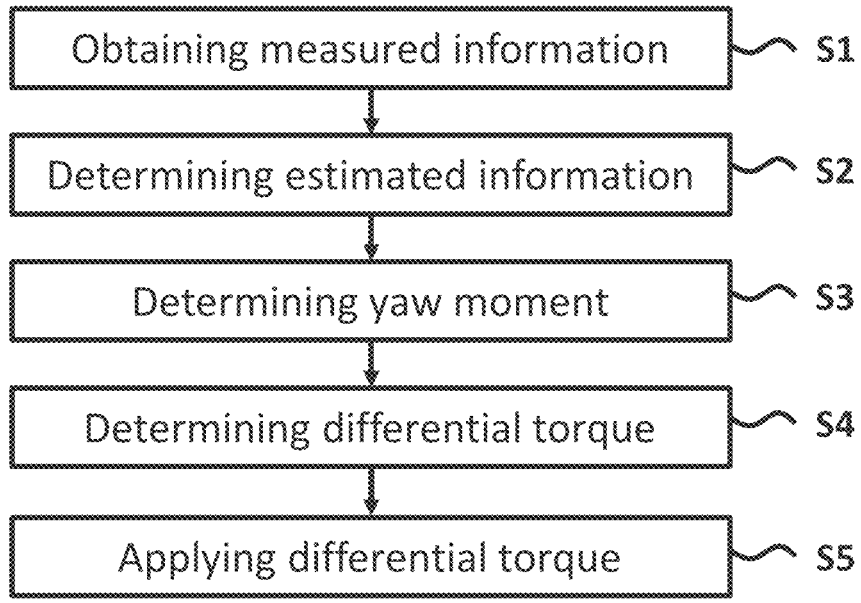
FIG. 1 shows a flowchart of a method according to an embodiment of the present invention.

FIG. 1 shows a flowchart of a method according to an embodiment of the present invention. A method for controlling motion of a vehicle comprises the steps of: obtaining measured information related to a state of the vehicle (S1); determining estimated information related to the state of the vehicle based on the measured information (S2); determining a yaw moment reducing a rate of change of a body slip angle of the vehicle based on the measured information and/or the estimated information (S3); determining at least one differential torque to be applied to at least two wheels of a same axis of the vehicle based on the body slip angle of the vehicle and the determined yaw moment (S4); and applying the at least one differential torque to the at least two wheels of the vehicle (S5).

In the context of the present disclosure, the term "differential torque" relates to a pair of two torques anti-symmetrically distributed on one axle.

In other words, if to an axle having two wheels a differential torque Δ is applied, this means that to one side of the axle, i.e., one wheel, a torque +Δ is applied and that to the other side of the axle, i.e., the other wheel, a torque −Δ is applied. It can be decided by convention, to which side of the axle the positive part of the differential torque is to be applied and to which side of the axle the negative part of the differential torque is applied.

It is noted that a differential torque may also applied on top of a "normal" torque that is applied to both sides of the axle equally. Such a combination of a "normal" torque T and a differential torque Δ then leads to torques T+Δ and T−Δ being applied to the two wheels of the axle, respectively.

The number of axles of the vehicle are not particularly limited and in particular the invention is not limited to be applied to all axles (and thus all wheels) of the vehicle. For example, the present invention may be applied to only one axle of a vehicles having two axles. Similarly, the present invention may not only be applied to a vehicle having four wheels with four independent motors, each associated with one wheel, but may also be applied to a vehicle having three independent motors, wherein two motors are associated to two wheels of one axle and the third motor drives the two wheels of the second axle.

In other words, it can be said that the only requirement of the present invention is that the vehicle has at least one axle with two independent motors that can drive the two wheels of said axle independently.

This in particular applies to step S4 of applying the at least one differential torque to the at least two wheels of the vehicle as this step may be understood as applying an additional torque, the differential torque, to the "normal" torque applied for driving the vehicle. Accordingly, the control by methods according to the present disclosure may be understood as applying additional torques, the differential torque, on top of the "normal torques" applied to the wheels of the vehicle.

Moreover, from this it can be understood that in embodiments according to the present disclosure, the number of the at least one differential torques to be applied may be equal to the number of axes of the vehicle.

In this context, it is also understood that the present disclosure is not particularly limited to the type of motor used.

In embodiments according to the present disclosure, the measured information may comprise at least one of a longitudinal acceleration, a lateral acceleration, a yaw rate, and a wheel speed of at least one wheel. Measurements providing the measured information can be realized by various means and sensors conventionally used in the art, such as acceleration sensors, yaw-rate sensors and gyroscopes, among others.

In embodiments according to the present disclosure, the estimated information may comprise at least one of a longitudinal velocity, a lateral velocity and the body slip angle of the vehicle. This estimation may follow conventional concepts of how these quantities can be estimated based on measured quantities such as the ones above and quantities of the vehicle.

In embodiments according to the present disclosure, the yaw moment determined in step S3 may be determined by evaluating at least one vehicle dynamics equation.

Further, in embodiments according to the present disclosure, the at least one vehicle dynamics equation may take into account the longitudinal acceleration, the lateral acceleration, the body slip angle, the longitudinal velocity, the lateral velocity, the yaw rate, and a polar moment of inertia of the vehicle. The polar moment of inertia is a fixed parameter of the vehicle and is also known as "second polar moment of area", sometimes even referred to simply as "moment of inertia".

Figure 2:
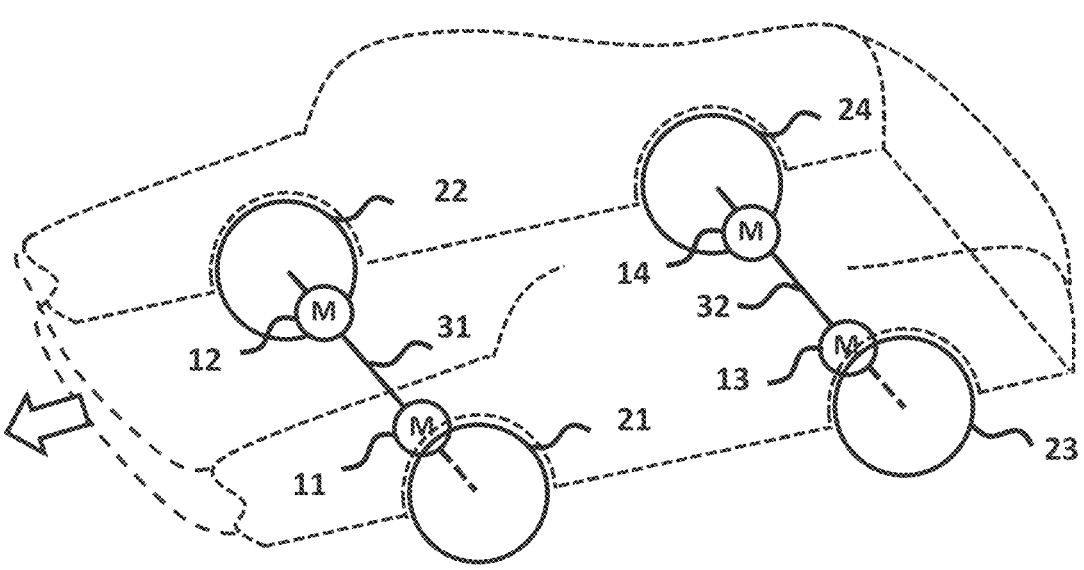
FIG. 2 shows a schematic model of an example of electric motors and respective wheels of a vehicle.

FIG. 2 shows a schematic model of an example of electric motors and respective wheels of a vehicle. The vehicle is shown in FIG. 2 as a car having four wheels and four motors for illustrative purpose only but is not limited to any specific type of vehicle or any specific number of motors or wheels. For example, the vehicle may be an airplane, a train, a tractor etc.

For example, the vehicle may have four wheels, a front left wheel 21, a front right wheel 22, a rear left wheel 23 and a rear right wheel 24. The front left wheel 21 and the front right wheel 22 indicate wheels located on a front part of the vehicle and may be referred to as front wheels. The rear left wheel 23 and the rear right wheel 24 indicate wheels located on a rear part of the vehicle and may be referred to as rear wheels. Also, the front left wheel 21 and the rear left wheel 23 indicate wheels located on a left side of the vehicle and may be referred to as right wheels. The front right wheel 22 and the rear right wheel 24 indicate wheels located on a left side of the vehicle and may be referred to as left wheels. The four motors of the vehicle shown in FIG. 2 correspond each to their respective wheels. Therefore, the four motors may be a front left motor 11, a front right motor 12, a rear left motor 13 and a rear right motor 14 each applying a torque to the front left wheel 21, the front right wheel 22, the rear left wheel 23 and the rear right wheel 24. Accordingly, the front left motor 11 and the front right motor 12 may be referred to as front motors and the rear left motor 13 and the rear right motor 14 may be referred to as rear motors. Also, the front left motor 11 and the rear left motor 13 indicate may be referred to as left motors and the front right motor 12 and the rear right motor 14 indicate may be referred to as right motors. As indicated, the front wheels 21 and 22 may be associated with the front axle 31 and the rear wheels 23 and 24 may be associated with the rear axle 32.

Therefore, in an example of the vehicle being a car as shown in FIG. 2, the method explained in FIG. 1 may be understood as follows. When the vehicle is driven, measured information is obtained and estimated information based on this measured information is obtained. Then, a yaw moment is determined such that said yaw moment reduces the rate of change of the body slip angle of the vehicle. This determination at least takes into account (or is based on) the measured information and/or the estimated information. In a next step, at least one differential torque is determined based on the determined yaw moment as well as the body slip angle of the vehicle. In a last step, this at least one differential torque is applied.

Figures 3, 4:
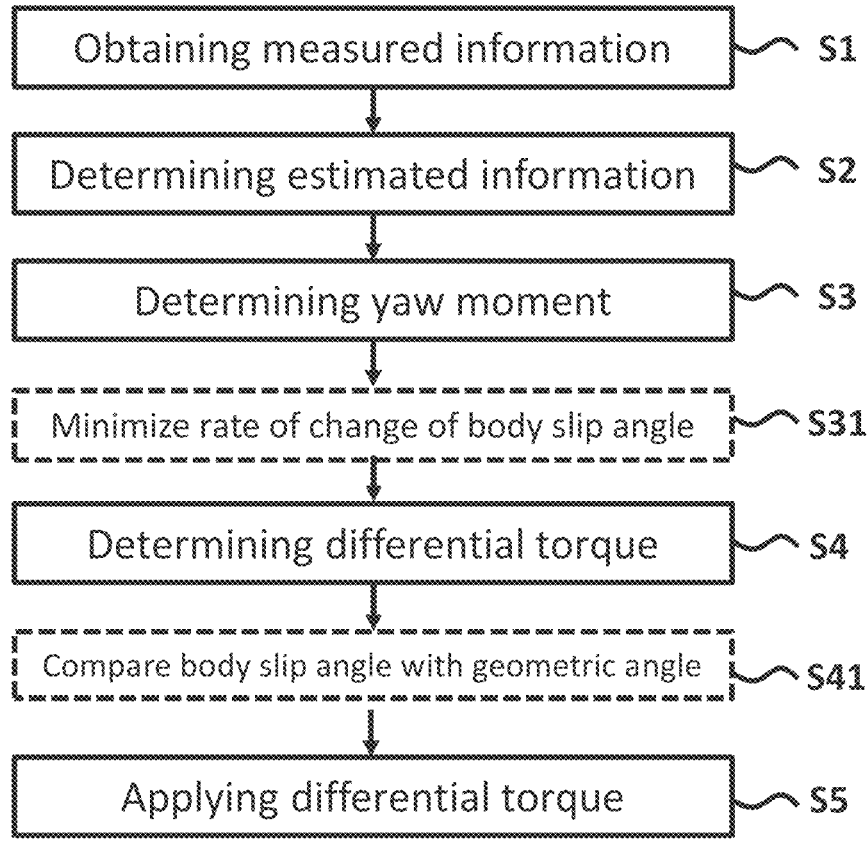
FIG. 3 shows a flowchart of a method according to an embodiment of the present invention.
FIG. 4 shows a device embodiment of the present invention.

FIG. 3 shows a flowchart of a method according to an embodiment of the present invention. Specifically, FIG. 3 shows further details of step S3 of determining the yaw moment reducing a rate of change of a body slip angle of the vehicle based on the measured information and/or the estimated information as well as further details of step S4 of determining at least one differential torque to be applied to at least two wheels of a same axis of the vehicle based on the body slip angle of the vehicle and the determined yaw moment. It is noted that the further details of these two steps are independent from each other and may or may not be present in an embodiment according to the present disclosure in combination.

The further details of step S3 comprise that in the step of determining the yaw moment the rate of change of the body slip angle of the vehicle may be minimized (S31).

Here, "minimizing" (or "minimized") includes finding a local minimum, a global minimum and/or an approximate minimum. In other words, this term is not particularly limited to a specific type of "minimum" and accordingly the methods involved to obtain this minimum are not particularly limited as well.

The further details of step S4 comprise that determining the differential torques to be applied to the at least two wheels of the vehicle may be based on a comparison of the body slip angle of the vehicle with a predetermined geometric angle (S41).

In embodiments according to the present disclosure, determining the differential torques to be applied may include determining an upper limit and a lower limit of the differential torques.

This may, for example, be to ensure that the difference in torques applied on the two sides of the axle are not too big and thus may serve safety purposes.

In addition, it is noted that also the total torques applied, i.e., the sum of the "normal" torque and the differential torque, may be subject to upper and lower limits.

In embodiments according to the present disclosure, if the body slip angle is equal to the predetermined geometric angle, the at least one differential torque to be applied may be equal to the average of the upper limit and the lower limit of the differential torques.

In embodiments according to the present disclosure, if the difference between the body slip angle and the predetermined geometric angle is less than a first threshold, a first part of the at least one differential torque applied to at least one inner wheel with respect to a curve being driven may be equal to the upper limit and a second part of the at least one differential torques applied to at least one outer wheel with respect to the curve being driven may be equal to the lower limit.

In embodiments according to the present disclosure, if the difference between the body slip angle and the predetermined geometric angle is more than a second threshold greater than the first threshold, the first part of the at least one differential torque applied to the at least one inner wheel with respect to the curve being driven may be equal to the lower limit and the second part of the at least one differential torque applied to the at least one outer wheel with respect to the curve being driven may be equal to the upper limit.

In embodiments according to the present disclosure, if the difference between the body slip angle and the predetermined geometric angle is between the first threshold and the second threshold, the at least one differential torque may be a continuous function of the body slip angle of the vehicle.

The predetermined geometric angle, the first threshold and the second threshold may be chosen on the basis of empirical data. They may, for example, be based on empirical data indicating the driving behavior of the vehicle, preferably for high body slip angles.

Further, the predetermined geometric angle, the first threshold and the second threshold may be chosen on the basis of the geometry and suspension kinematics of the vehicle.

Further, the first and the second may be symmetric to each other with respect to the predetermined geometric angle.

In embodiments according to the present disclosure, if the difference between the body slip angle and the predetermined geometric angle is less than a first threshold, the at least one differential torque applied to at least one inner wheel with respect to a curve being driven may be equal to the upper limit and the at least one differential torques applied to at least one outer wheel with respect to the curve being driven is equal to the lower limit.

In embodiments according to the present disclosure, if the difference between the body slip angle and the predetermined geometric angle is more than a second threshold greater than the first threshold, the at least one differential torque applied to the at least one inner wheel with respect to the curve being driven is equal to the lower limit and the at least one differential torque applied to the at least one outer wheel with respect to the curve being driven is equal to the upper limit.

In embodiments according to the present disclosure, if the difference between the body slip angle and the predetermined is between the first threshold and the second threshold, the at least one differential torque may be a continuous function of the body slip angle of the vehicle.

Figure 8:
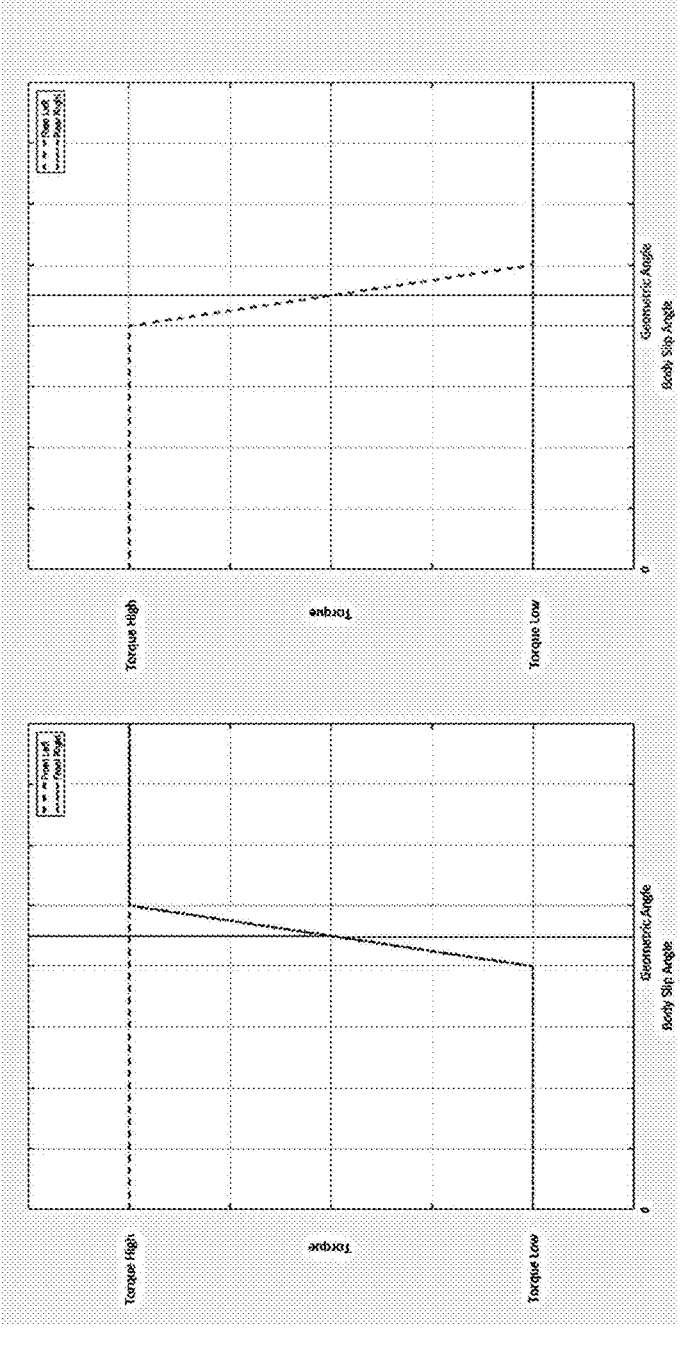
FIG. 8 shows a torque allocation according to an embodiment of the present invention.

Further details of these concepts are described elsewhere in this document, in particular in FIG. 8.

FIG. 4 shows a device embodiment of the present invention.

This device can be, for example, a powertrain control unit or a separate vehicle dynamics control unit embedded in a vehicle. The device 100 may comprise a processor 101, a memory 102 as well as a communication interface 103. The memory 102 may store code or may have access to code that instructs the processor 101 to perform the steps of any method embodiment of the present invention as elaborated above. The communication interface 103 may be adapted for receiving communication data over a network. The network may be wired or wireless network.

The device 100 can generally be a computer, an electronic control unit (ECU), etc.

The processor 101 may be embodied by one or more processing units, such as a central processing unit (CPU), or may also be provided by a microcontroller unit (MCU).

The memory 102 which can be embodied by local memory which may include but not limited to, a read-only memory (ROM), a random-access memory (RAM), a programmable read-only memory (PROM) and an electrically erasable programmable read-only memory (EEPROM).

The communication interface 103 may be adapted for providing and/or receiving data from the processor 101 and for providing and/or receiving data from the memory 102 over a communication network. The communication network may be a wired or a wireless network. The device 100 may be configured to execute a method for controlling motion of a vehicle, the method comprising the steps of: obtaining measured information related to a state of the vehicle; determining estimated information related to the state of the vehicle based on the measured information; determining a yaw moment reducing a rate of change of a body slip angle of the vehicle based on the measured information and/or the estimated information; determining at least one differential torque to be applied to at least two wheels of a same axis of the vehicle based on the body slip angle of the vehicle and the determined yaw moment; and applying the at least one differential torque to the at least two wheels of the vehicle.

Alternatively, the device 100 schematically shown in FIG. 4 might be the vehicle that is configured to execute a method for controlling motion of a vehicle, the method comprising the steps of: obtaining measured information related to a state of the vehicle; determining estimated information related to the state of the vehicle based on the measured information; determining a yaw moment reducing a rate of change of a body slip angle of the vehicle based on the measured information and/or the estimated information; determining at least one differential torque to be applied to at least two wheels of a same axis of the vehicle based on the body slip angle of the vehicle and the determined yaw moment; and applying the at least differential torque to the at least two wheels of the vehicle.

In the following, with reference to FIGS. 5 to 10, further details of embodiments according to the present disclosure will be discussed.

Figure 5:
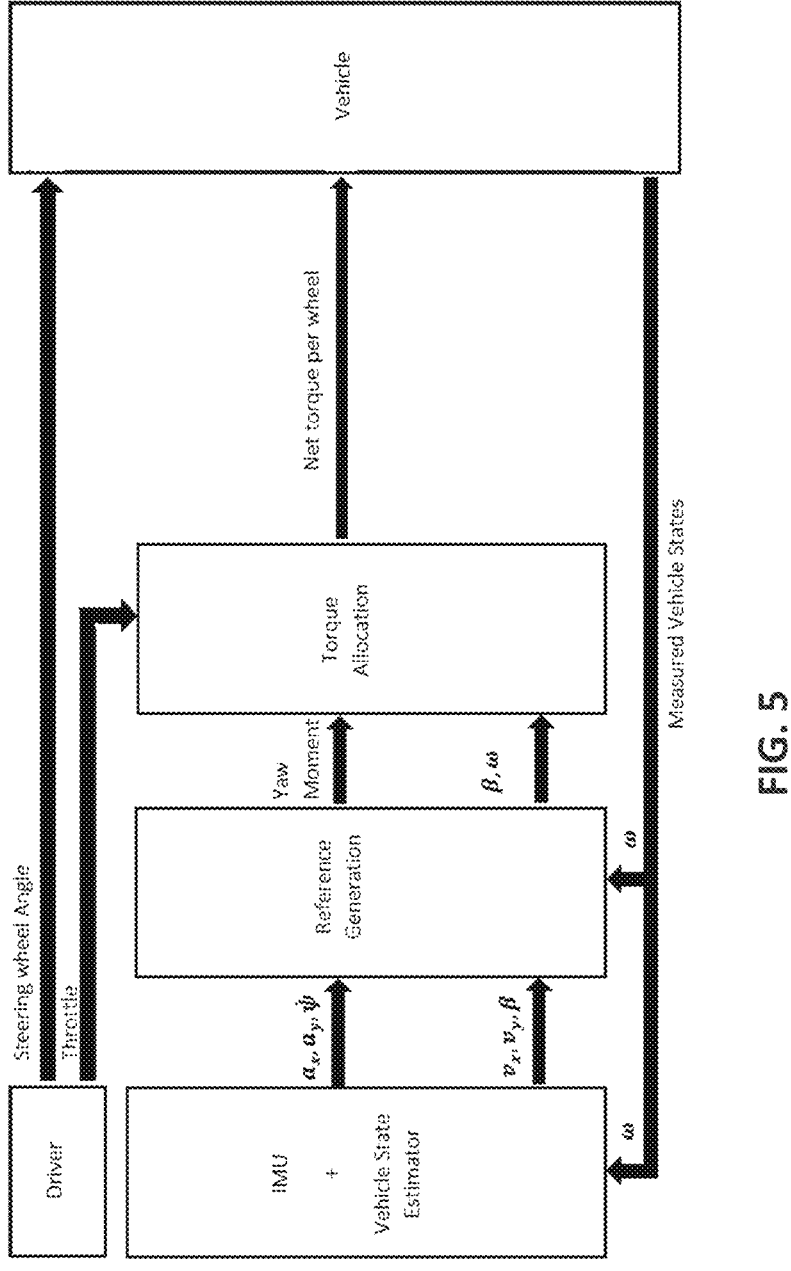
FIG. 5 shows a control architecture according to an embodiment of the present invention.

FIG. 5 shows a control architecture according to an embodiment of the present invention. Specifically, shows how the driver, the Inertial measurement unit (IMU) and vehicle state estimator, the reference generation, the torque allocation and the vehicle interact together and how information is provided from one element to the other and how it is processed. It is noted that these elements are to be understood as functional blocks.

The driver provides, as input, the steering wheel angle by operating the steering wheel and the throttle, i.e., a power request, for example, by operating the throttle pedals. The steering wheel angle is provided direct to the vehicle, while the throttle is provided to the torque allocation. Alternatively, the input may be provided by means of an autonomous driving module. In other words, the present invention is not limited to input provided by a driver but may instead also be applied to an autonomously driven vehicle.

The vehicle provides measured vehicle states to the IMU and vehicle state estimator as well as the reference generation. Here, measured vehicle states may correspond to the measured information related to a state of the vehicle used elsewhere in this document. Further, this may in particular include the wheel speed $\omega$ of at least one wheel.

The IMU and vehicle state estimator provides in particular the longitudinal acceleration $a_x$, lateral acceleration $a_y$, and the yaw rate $\dot{\psi}$ as well as the longitudinal velocity $v_x$, the lateral velocity $v_y$ and the body slip angle $\beta$ to the reference generation.

The IMU and the vehicle state estimator can thus be understood as performing the step of obtaining measured information related to a state of the vehicle. Further, the IMU and the vehicle state estimator can be understood as performing the step of determining estimated information related to the state of the vehicle based on the measured information.

The reference generation, based on the provided input from the IMU and the vehicle state estimator as well as the vehicle, provides the yaw moment as well as the body slip angle $\beta$ and the wheel speed $\omega$ to the torque allocation.

The reference generation may thus be understood as performing the step of determining a yaw moment reducing a rate of change of a body slip angle of the vehicle based on the measured information and/or the estimated information.

The torque allocation, based on the provided input from the reference generation, i.e., the yaw moment, the wheel speed $\omega$, and the body slip angle $\beta$, and from the driver, i.e., the throttle, may determine the net torque to be applied, that is the combination of the "normal" torque and the differential torque.

The torque allocation may thus be understood as performing the step of determining at least one differential torque to be applied to at least two wheels of a same axis of the vehicle based on the body slip angle of the vehicle and the determined yaw moment.

Finally, the vehicle applies the net torque and may thus be understood as performing the step of applying the at least one differential torque to the at least two wheels of the vehicle.

Figure 6A:
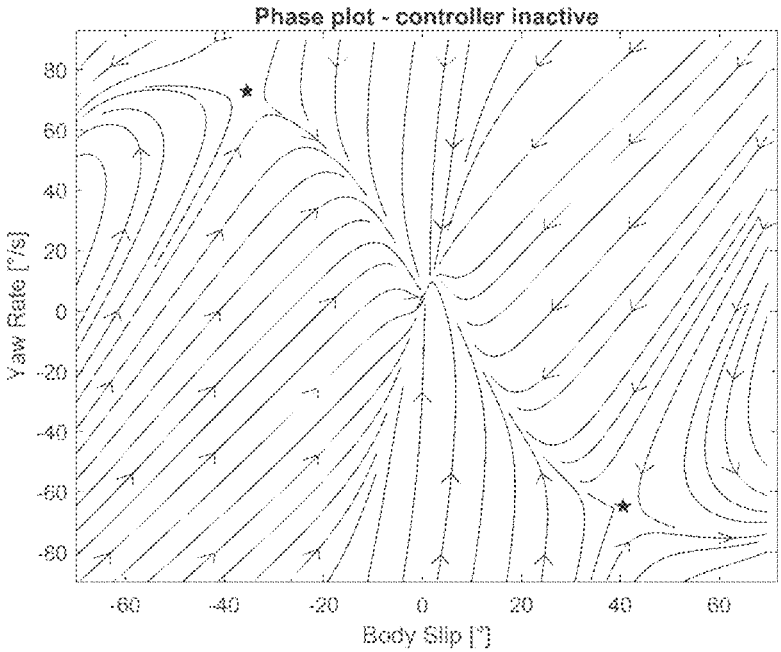
FIG. 6*a* shows a phase plot of a control system according to an embodiment of the present invention being inactive.
Figure 6B:
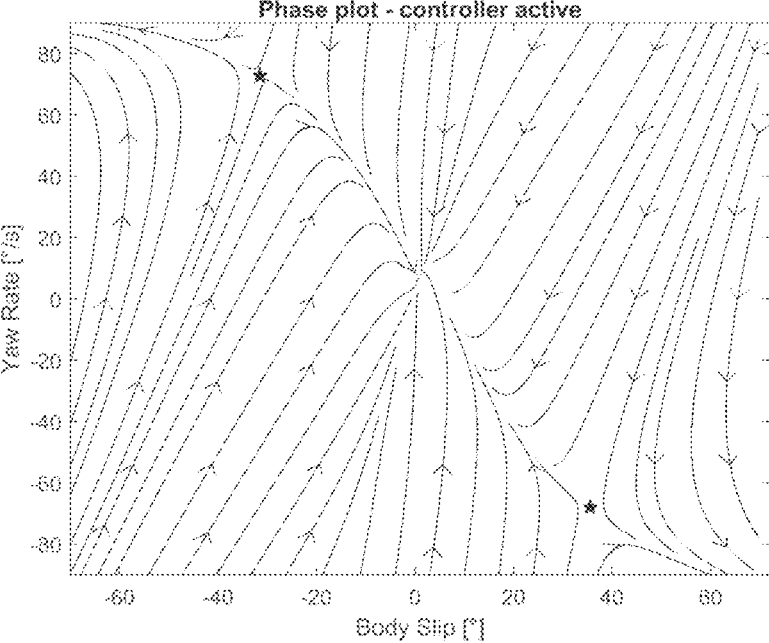
FIG. 6*b* shows a phase plot of a control system according to an embodiment of the present invention being active.

FIG. 6*a* shows a phase plot of a control system according to an embodiment of the present invention being inactive, while FIG. 6*b* shows a phase plot of a control system according to an embodiment of the present invention being active.

Both phase plots correspond to a vehicle driven at 60 km/h and with a steering wheel angle of 30°. The x-axis of both plots shows the body slip angle in units of degrees [°], the y-axis shows the yaw rate in degrees per second [°/s].

The arrows indicate the direction in which the vehicle being in a state corresponding to a point in the phase plot is driven. Accordingly, a vehicle in a such is driven out of its momentary state and hence it can be said that it is in a non-equilibrium state. The points indicated with a star indicate points of equilibrium, i.e., points in which the system remains in its current configuration. These states are the desired states for the vehicle as they allow the vehicle to be stable.

Clearly, the system has a further equilibrium state at the body slip angle and the yaw rate being equal to zero, however, for the purpose of the present disclosure directed at controlling the motion of the vehicle at high body slip angles, this equilibrium is of reduced interest.

While this equilibrium state is a stable equilibrium state (all phase plots lines in its vicinity go towards the equilibrium state), the two equilibrium states of interest are unstable equilibrium states (the phase plots lines in its vicinity go away from the equilibrium state). This makes clear that control is required to remain in these equilibrium states.

Figure 7A:
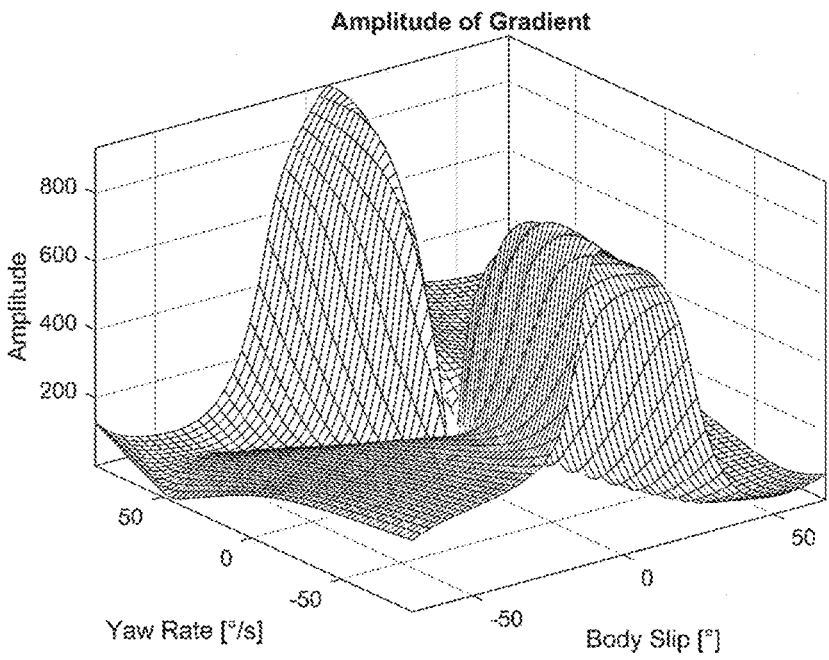
FIG. 7*a* shows an amplitude of the gradient of a control system according to an embodiment of the present invention being inactive.
Figure 7B:
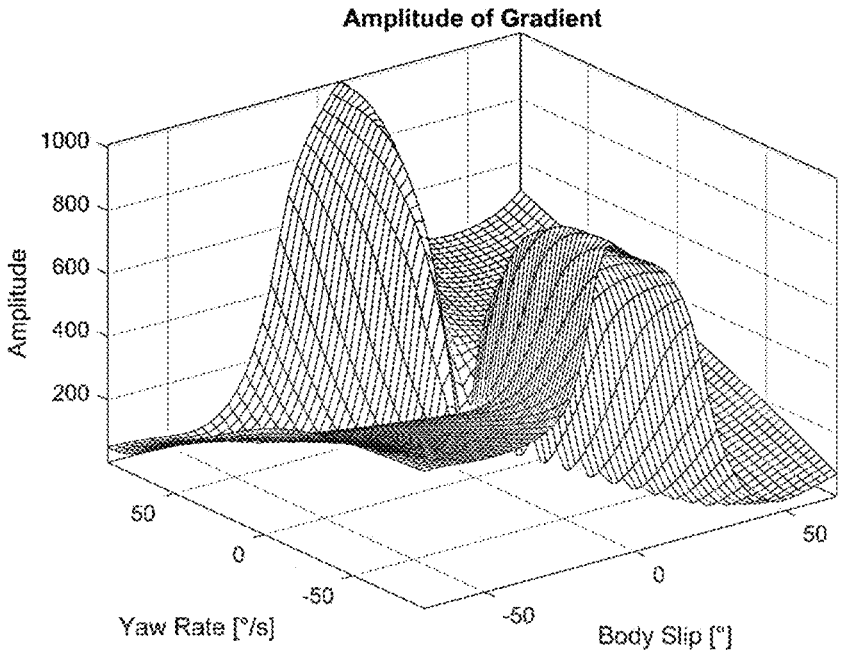
FIG. 7*b* shows an amplitude of the gradient of a control system according to an embodiment of the present invention being active.

FIG. 7a shows an amplitude of the gradient of a control system according to an embodiment of the present invention being inactive, while FIG. 7b shows an amplitude of the gradient of a control system according to an embodiment of the present invention being active.

FIGS. 7a and 7b correspond to FIGS. 6a and 6b in the sense that they describe the same underlying scenario and the x- and y-axes of FIGS. 6a and 6b correspond to the x- and y-axes of FIGS. 7a and 7b, while the z-axis of FIGS. 7a and 7b show the amplitude of the gradient of shown in the phase plots of FIGS. 6a and 6b, respectively.

From the amplitude of the gradient in FIG. 7b, the "active system", having higher values than in FIG. 7a, the "inactive system", one can understand that the controller enhances the vehicle's capability to arrive at the desired equilibrium states and to remain in the same.

FIG. 8 shows a torque allocation according to an embodiment of the present invention. Specifically, FIG. 8 shows two plots of torques to be applied to a front axle (left plot, showing the front left wheel with a dashed line and the front right wheel with a dashed-dotted line) and a rear axle (right plot showing the rear left wheel with a dashed line and the rear right wheel with a dashed-dotted line) of a vehicle with four wheels and four independent motors. The torque is shown as a function of the body slip angle.

FIG. 8 further shows upper and lower limits for the torque which are equal for both wheels, indicated as "Torque High" and "Torque Low", respectively. As can be seen, in this embodiment, the torques of the front left wheel and the rear right wheel are set to be constant to the upper limit and the lower limit, respectively, and only the torques of the front right wheel and the rear left wheel are changed.

Further, FIG. 8 shows the elsewhere discussed geometric angle according to which the torque to be applied is controlled. As can be seen, if the body slip angle is equal to the geometric angle, the torque is equal to the average of the upper and the lower limit. If the body slip angle is far removed from the geometric angle, the torque is equal to the lower or upper limit. If the body slip angle approaches the geometric angle, the torques controlled start to change continuously until the reach the opposite limit.

In the following further details of methods according to embodiments of the present disclosure will be discussed, in particular with an emphasis on how the input, i.e., the measured and estimated information, is used to determine the torques to be applied.

In an embodiment according to the present disclosure, this can be achieved by the controller performing the method being realized by a high-level controller and a low-level controller.

In the high-level controller a yaw moment reducing a rate of change of a body slip angle of the vehicle based on the measured information and/or the estimated information is determined. As also discussed elsewhere in this disclosure, input for this controller may be a longitudinal acceleration, a lateral acceleration, a yaw rate, and a wheel speed of at least one wheel, which all may be measured quantities. From this, a longitudinal velocity, a lateral velocity and a body slip angle may be estimated.

In the low-level controller, the determined yaw moment is distributed among the axles and wheels of the vehicle. In other words, at least one differential torque to be applied to at least two wheels of a same axis of the vehicle based on the body slip angle of the vehicle and the determined yaw moment is determined. As discussed elsewhere in this disclosure, input of this step may be the determined yaw moment, the wheel speeds, and the estimated body slip angle.

Now, further details of the high-level controller will be discussed. As mentioned, the objective of this controller is to find a yaw moment that reduces or minimizes the rate of change of the body slip angle, given the input of longitudinal acceleration, lateral acceleration, yaw rate, wheel speeds, longitudinal velocity, lateral velocity and body slip angle.

One reasonable approach is to use a first-order iterative optimization algorithm, for example a gradient descent method or similar methods well known in the art, i.e., to perform an online optimization on the basis of the differentiable vehicle dynamics equations.

An alternative approach can be to address the problem analytically. The problem of finding a yaw moment $M_z$ that minimizes the rate of change of body slip angle $\dot{\beta}$ can be formulated as $$\min_{M_z} \dot{\beta}(M_z).$$

As equations of the lateral motion of the vehicle are known, see for example "Vehicle handling dynamics: theory and application" by M. Abe, published 2015 by Butterworth-Heinemann, equations for the body slip angle as a function of the parameters and variables of the motion of the vehicle and the vehicle can be derived.

These equations may take into account the longitudinal acceleration, the lateral acceleration, the body slip angle, the longitudinal velocity, the lateral velocity, the yaw rate, and a polar moment of inertia of the vehicle.

Now, further details of the low-level controller will be discussed. As mentioned, the objective of this controller is to distribute the determined yaw moment $M_z$ among the axles and wheels of the vehicle.

A "Torque$_{high}$" and a "Torque$_{low}$" are determined as $$Torque_{high} = \frac{\text{wheel radius}}{\text{front trackwidth} + \text{rear trackwidth}} \times M_z$$

$$Torque_{low} = -\frac{\text{wheel radius}}{\text{front trackwidth} + \text{rear trackwidth}} \times M_z$$

Then, the body slip angle is compared to a predetermined geometric angle and depending on this comparison a torque is applied to each of the wheels of the vehicle, the torques being between Torque$_{high}$ and Torque$_{low}$. This can be, for example, implemented as discussed in connection with FIG. 8. The choice of the predetermined angle may be based, for example, on empirical data.

As discussed in connection with FIG. 8, the switch from Torque$_{high}$ to Torque$_{low}$ (and vice versa) as a function is preferably smooth, but not further limited in this regard. For example, a quadratic function or any polynomial function may be used instead of the linear function shown in FIG. 8.

FIGS. 9a to 9d show a steering wheel angle, a yaw moment, a body slip angle and a rate of change of a body slip angle according to an embodiment of the present invention.

Similarly, also FIGS. 10a to 10d show a steering wheel angle, a yaw moment, a body slip angle and a rate of change of a body slip angle according to an embodiment of the present invention, however at different vehicle motion parameters.

In the following, first FIGS. 9a to 9d will be described and then FIGS. 10a to 10d will be described with an emphasis on the difference with respect to FIGS. 9a to 9d.

Figure 9A:
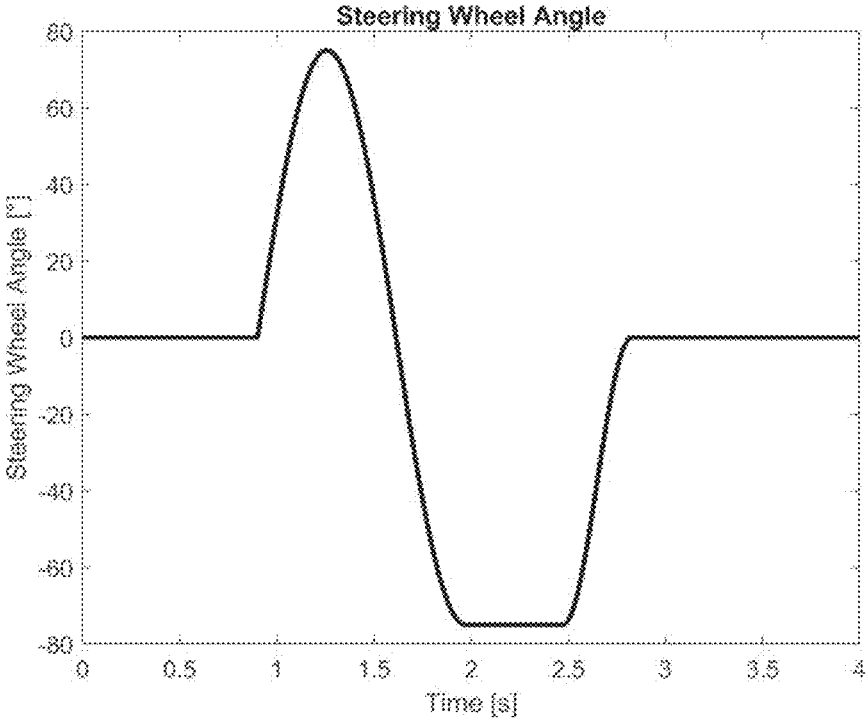
FIGS. 9*a* to 9*d* show a steering wheel angle, a yaw moment, a body slip angle and a rate of change of a body slip angle according to an embodiment of the present invention.

FIGS. 9a to 9d relates to a maneuver at 80 km/h in which a sine with a dwell in the second part of the sine is carried out, wherein the maximum steering wheel angle is 75°, as can be seen in FIG. 9a. All four figures show plots as a function of time and are related to each other, i.e., show the same quantities at the same time.

Figure 9B:
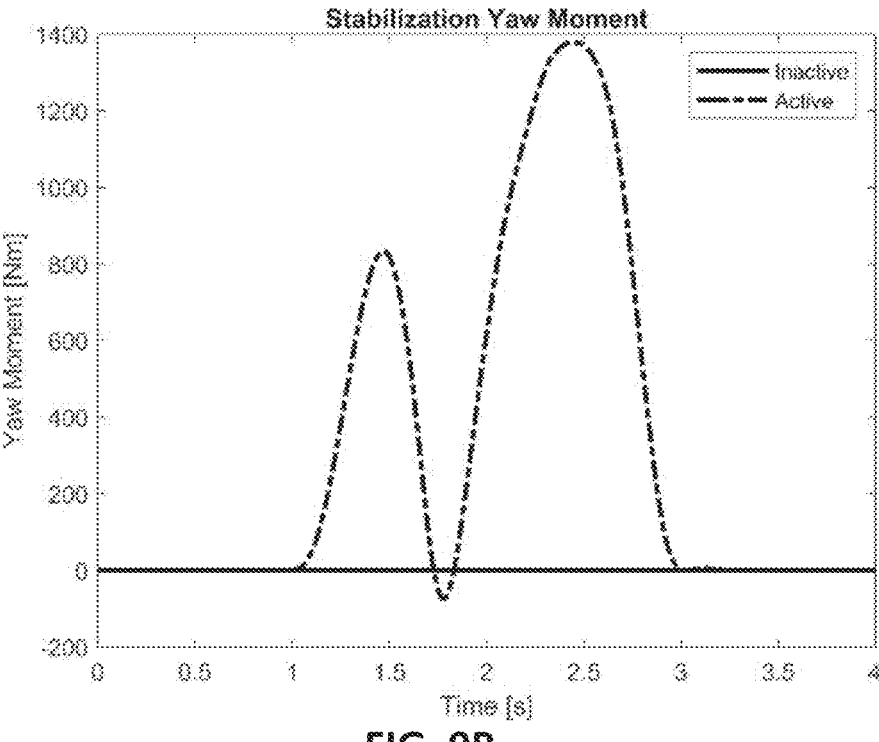
Figure 9C:
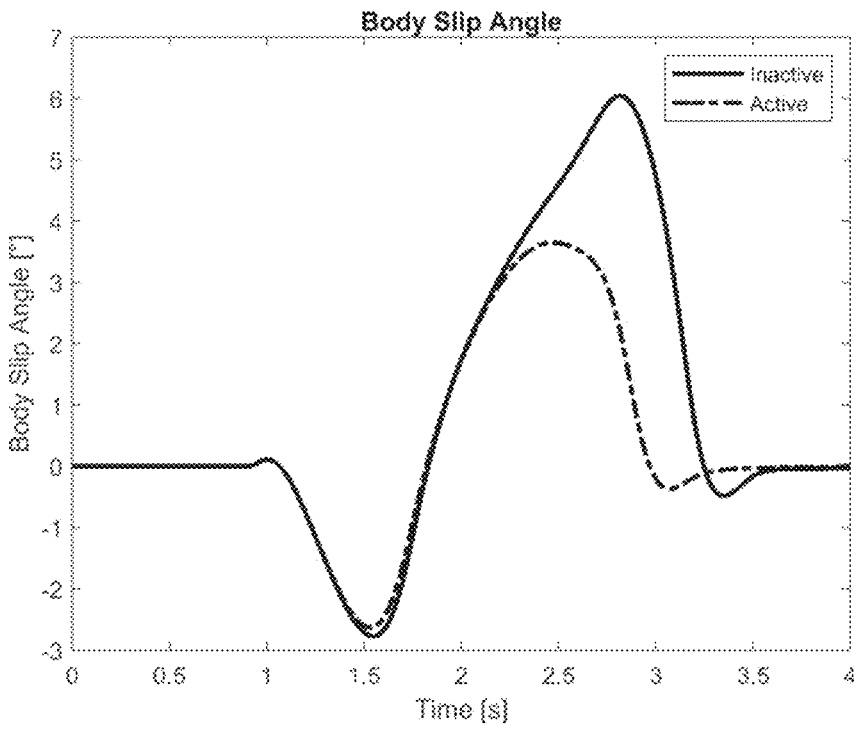
Figure 9D:
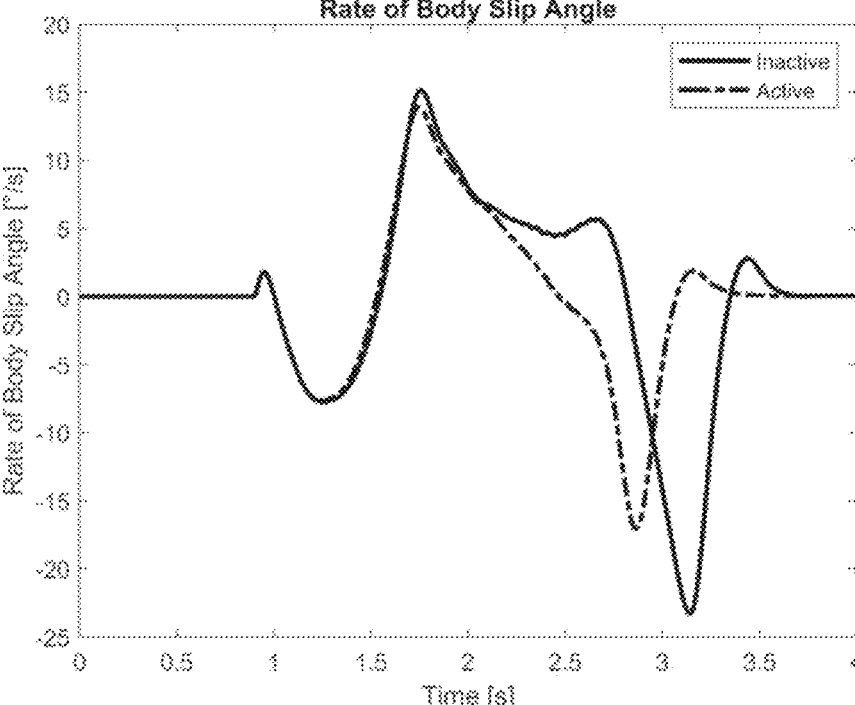

FIGS. 9b to 9d show the stabilization yaw moment, the body slip angle and the rate of change of the body slip angle, respectively.

Importantly, all three figures show the case of the controller being inactive, i.e., the present invention not being applied (the solid lines) as well as the case of the controller being active, i.e., the present invention being applied (the dashed lines). Accordingly, a comparison of the present invention with conventional solutions can be made.

FIG. 9b shows the stabilization yaw moment, that is, the yaw moment determined such that the rate of change of the body slip angle is minimized. As no such determination is carried out when the controller is inactive, the solid line is constant and equal to zero. As can be seen from FIG. 9b, the yaw moment can be both positive and negative and is not limited in this regard.

FIG. 9c shows the body slip angle. Here, it can be seen that the controller, aiming at minimizing the rate of change of the body slip angle, leads to an overall smaller body slip angle. This can be seen both in the first part of the maneuver, around 1.5 seconds, but in particular the second part of the maneuver in which not only the maximum amplitude of the body slip angle is much smaller (less than 4° for the active controller compared to more than 6° for the inactive controller), but also the return to 0° body slip angle occurs earlier.

FIG. 9d shows the rate of change of the body slip angle. In line with the discussion of FIG. 9c, one can see the effect of the controller aiming at reducing the rate of change of the body slip angle. In particular, one can see that the active controller plot "reacts faster" than the in active controller plot, in particular in the second part of the maneuver.

Figure 10A:
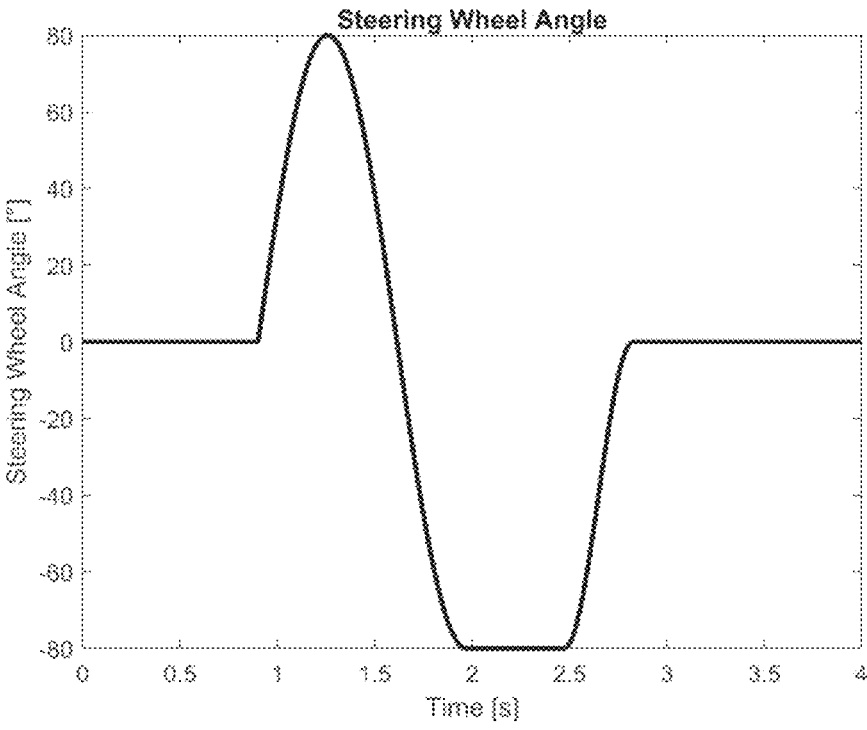
FIGS. 10*a* to 10*d* show a steering wheel angle, a yaw moment, a body slip angle and a rate of change of a body slip angle according to an embodiment of the present invention.

The maneuver shown in FIGS. 10a to 10d is substantially the same, with the difference that the maximum steering wheel angle is 80° instead of 75°, see FIG. 10a.

Figure 10B:
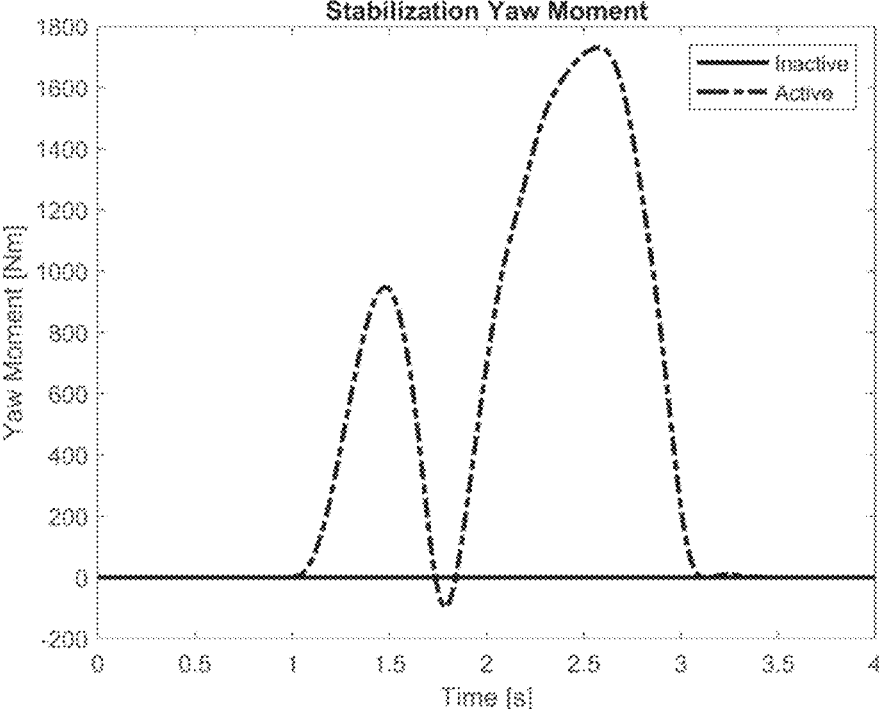

Consequently, the yaw moment shown in FIG. 10b is substantially the same, i.e., its shape is similar to the one shown in FIG. 9b, however, the maximum amplitude is clearly higher: While the yaw moment in FIG. 9b does not exceed 1400 Nm, the yaw moment in FIG. 10b clearly exceeds 1700 Nm.

Figure 10C:
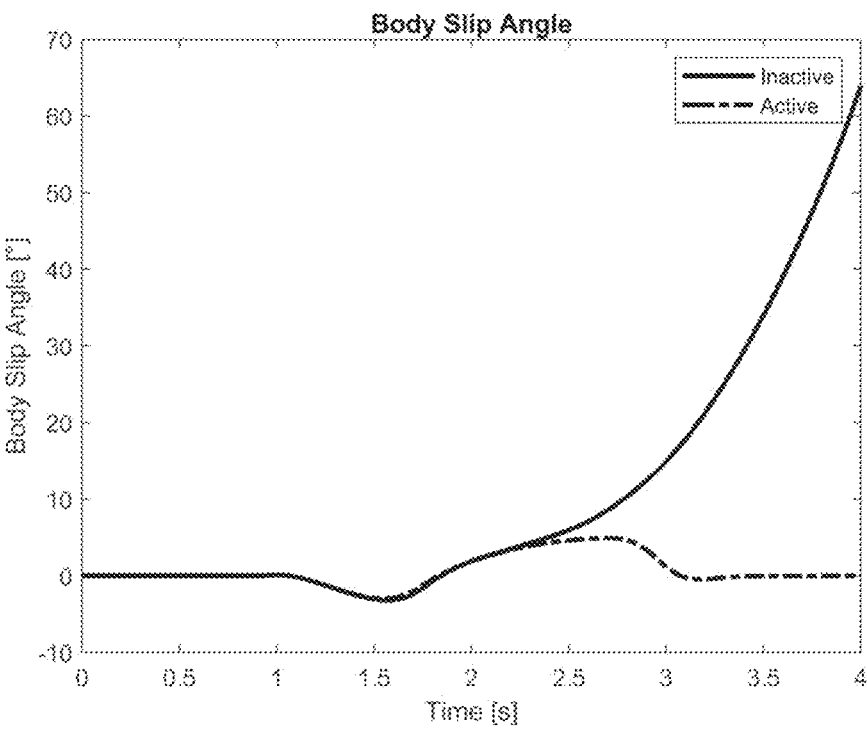

A more drastic change with respect to FIGS. 9a to 9d can be seen in FIG. 10c. While the body slip angle in the case of the active controller is similar to FIG. 10c, i.e., a curve into negative body slip angles following by a bigger curve into positive body slip angles and then returning to zero body slip angle, the case of the inactive controller differs substantially in the second part: The body slip angle increases drastically and does not return to zero. In other words, control over the vehicle is lost.

Figure 10D:
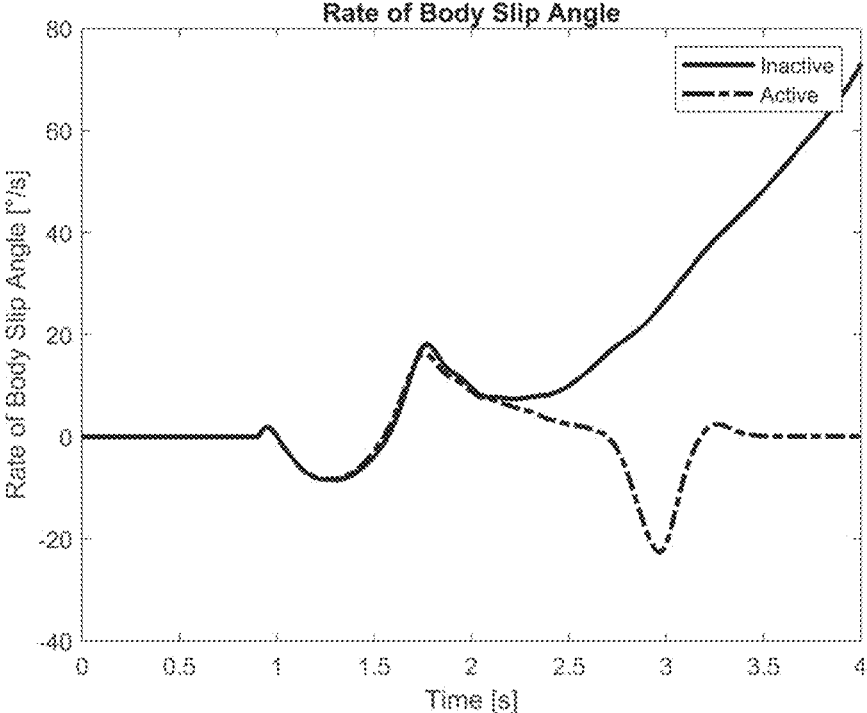

Corresponding observations can be made with respect to FIG. 10d as also here the curves of active and inactive controller substantially correspond to each other for the first part of the maneuver and moreover the active controller curve of FIG. 10d substantially corresponds to the active controller curve of FIG. 9d. However, the inactive controller curve of FIG. 10d, similar to FIG. 10c, increases steadily and to far higher values as the active controller curve. In other words, also from this plot, one can understand that control over the vehicle is lost.

In view of the above, it becomes clear that methods according to the present invention allow to perform maneuvers at high body slip angle, in particular that by controlling the rate of change of the body slip angle and providing a yaw moment and a corresponding differential torque that to reduce the rate of change of the body slip angle allows to perform such maneuvers.

It moreover can be understood that the methods according to the present invention are not steering the vehicle towards a predetermined state, e.g., a predetermined body slip angle but instead towards the state in which the rate of change of the body slip angle is minimized. Hence, the methods according to the present disclosure are able to adapt to any situation.

Moreover, as can be seen when comparing the differences between the active and the inactive controller in FIGS. 9a to 9d, in a situation where the controller is not necessary to maintain control of the vehicle, the changes are rather gradual adjustments not overriding the commands of the driver but readjusting them for improved control. Consequently, an intuitive experience can be provided to the driver, that avoid abrupt changes.

By controlling, in particular by minimizing, the rate of change of the body slip angle instead of controlling the body slip angle to a predetermined value, the vehicle is not steered to a specific configuration but finds its equilibrium on its own. This makes the vehicle more controllable, i.e., more controllable during the maneuver at high body slip angle.

Further, embodiments according to the present disclosure do not override commands by the driver but instead readjust them. As a consequence, the driver's experience is more intuitive, and since the changes in the trajectory of the vehicle compared to the inactive controller are only gradual in nature, abrupt changes can be avoided, hence also improving the safety of driving the vehicle.

Although detailed embodiments have been described, these only serve to provide a better understanding of the invention defined by the independent claims and are not to be seen as limiting to the present invention.

What is claimed is:

1. A method for controlling motion of a vehicle, the method comprising:

obtaining measured information related to a state of the vehicle;

determining estimated information related to the state of the vehicle based on the measured information;

determining a yaw moment reducing a rate of change of a body slip angle of the vehicle based on the measured information and/or the estimated information;

determining at least one differential torque to be applied to at least two wheels of a same axis of the vehicle based on the body slip angle of the vehicle and the determined yaw moment; and applying the at least one differential torque to the at least two wheels of the vehicle;

wherein the measured information comprises at least one of a longitudinal acceleration, a lateral acceleration, a yaw rate, and a wheel speed of at least one wheel.

2. The method of claim 1, wherein when determining the yaw moment the rate of change of the body slip angle of the vehicle is minimized.

3. The method of claim 1, wherein determining the differential torque to be applied to the at least two wheels of the vehicle is based on a comparison of the body slip angle of the vehicle with a predetermined geometric angle.

4. The method of claim 1, wherein determining the differential torque to be applied includes determining an upper limit and a lower limit of the differential torque.

5. The method of claim 4, wherein determining the differential torque to be applied to the at least two wheels of the vehicle is based on a comparison of the body slip angle of the vehicle with a predetermined geometric angle;

wherein, if the body slip angle is equal to the predetermined geometric angle, the at least one differential torque to be applied is equal to an average of the upper limit and the lower limit of the differential torque.

6. The method of claim 3, wherein determining the differential torque to be applied includes determining an upper limit and a lower limit of the differential torque;

wherein if a difference between the body slip angle and the predetermined geometric angle is less than a first threshold, a first part of the at least one differential torque applied to at least one inner wheel with respect to a curve being driven is equal to the upper limit and a second part of the at least one differential torque applied to at least one outer wheel with respect to the curve being driven is equal to the lower limit.

7. The method of claim 6, wherein if the difference between the body slip angle and the predetermined geometric angle is more than a second threshold greater than the first threshold, the first part of the at least one differential torque applied to the at least one inner wheel with respect to the curve being driven is equal to the lower limit and the second part of the at least one differential torque applied to the at least one outer wheel with respect to the curve being driven is equal to the upper limit.

8. The method of claim 7, wherein if the difference between the body slip angle and the predetermined geometric angle is between the first threshold and the second threshold, the at least one differential torque is a continuous function of the body slip angle of the vehicle.

9. The method of claim 1, wherein a number of the at least one differential torque to be applied is equal to a number of axes of the vehicle.

10. The method of claim 1, wherein the estimated information comprises at least one of a longitudinal velocity, a lateral velocity and the body slip angle of the vehicle.

11. The method of claim 1, wherein the yaw moment is determined by evaluating at least one vehicle dynamics equation.

12. The method of claim 11, wherein the estimated information comprises at least one of a longitudinal velocity, a lateral velocity and the body slip angle of the vehicle;

wherein the at least one vehicle dynamics equation takes into account the longitudinal acceleration, the lateral acceleration, the body slip angle, the longitudinal velocity, the lateral velocity, the yaw rate, and a polar moment of inertia of the vehicle.

13. A vehicle, comprising:

at least one processor; and a memory storing one or more instructions, which when executed by the at least one processor, cause the vehicle to:

determine estimated information related to a state of the vehicle based on measured information;

determine a yaw moment reducing a rate of change of a body slip angle of the vehicle based on the measured information and/or the estimated information;

determine at least one differential torque to be applied to at least two wheels of a same axis of the vehicle based on the body slip angle of the vehicle and the determined yaw moment; and apply the at least differential torque to the at least two wheels of the vehicle;

wherein the measured information comprises at least one of a longitudinal acceleration, a lateral acceleration, a yaw rate, and a wheel speed of at least one wheel.

14. A device, comprising:

at least one processor; and a memory storing one or more instructions, which when executed by the at least one processor, cause a vehicle to:

obtain measured information related to a state of the vehicle;

determine estimated information related to the state of the vehicle based on the measured information;

determine a yaw moment reducing a rate of change of a body slip angle of the vehicle based on the measured information and/or the estimated information;

determine at least one differential torque to be applied to at least two wheels of a same axis of the vehicle based on the body slip angle of the vehicle and the determined yaw moment; and apply the at least one differential torque to the at least two wheels of the vehicle;

wherein the measured information comprises at least one of a longitudinal acceleration, a lateral acceleration, a yaw rate, and a wheel speed of at least one wheel.

* * * * *